United States Patent [19]
Bailey et al.

[11] Patent Number: 5,179,474
[45] Date of Patent: Jan. 12, 1993

[54] VIEWER FOR A SORTING MACHINE

[75] Inventors: Roger F. Bailey, Sugar Land; Elias H. Codding, Houston, both of Tex.

[73] Assignee: Delta Technology Corporation, Houston, Tex.

[21] Appl. No.: 672,835

[22] Filed: Mar. 21, 1991

[51] Int. Cl.⁵ .............................................. G02B 27/02
[52] U.S. Cl. .................................. 359/798; 359/894; 359/387; 250/224; 250/226; 362/30
[58] Field of Search ............... 359/798, 801, 804, 806, 359/850, 868, 893, 894, 896, 391, 392, 398, 387; 362/29, 30; 250/223 R, 224, 226, 227.11; 209/509, 549, 581, 587

[56] References Cited

U.S. PATENT DOCUMENTS

| | | |
|---|---|---|
| 3,028,960 | 4/1962 | Currie et al. |
| 3,382,975 | 5/1968 | Hoover ............................ 250/224 |
| 3,738,484 | 6/1973 | Hoover et al. |
| 3,914,601 | 10/1975 | Hoover et al. ...................... 250/226 |
| 3,936,156 | 2/1976 | Shaw et al. ......................... 359/804 |
| 4,057,146 | 11/1977 | Castaneda et al. .................. 209/581 |
| 4,203,673 | 5/1980 | Buckson ............................. 250/224 |
| 4,432,648 | 2/1984 | Musto et al. ........................ 250/224 |
| 4,454,029 | 6/1984 | Codding ............................. 250/226 |
| 4,513,868 | 4/1985 | Culling et al. ...................... 209/581 |
| 4,697,709 | 10/1987 | Codding ............................. 209/549 |
| 4,699,274 | 10/1987 | Saika ................................. 209/587 |

FOREIGN PATENT DOCUMENTS 2136957A 9/1984 United Kingdom.

OTHER PUBLICATIONS

"DSB-201 Bichromatic Color Sorter" Delta Technology Corp. (assignee of the invention described in this app.), 1983.
"Model DSX-404 Multichannel Ratiometric/Bichromatic Color Sorter," Delta Technology Corp., 1986.
"Models DSR-114 and DSR-214 Color Sorter," Delta Technology Corp., 1986.
"Model DSM-HRS Monochromatic Scanner," Delta Technology Corp., 1986.
"Model DSRM-600 Superscan," Delta Technology Corp., 1987.

Primary Examiner—Loha Ben
Attorney, Agent, or Firm—Pravel, Gambrell, Hewitt, Kimball & Krieger

[57] ABSTRACT

Viewer apparatus for object sorting machines and illumination system for such viewers, the viewer in one embodiment having a housing with a viewing device and a light source mounted therein and an opening through which objects to be sorted pass, with one or more reflectors disposed in the housing to reflect light onto portions of the object.

21 Claims, 1 Drawing Sheet

VIEWER FOR A SORTING MACHINE

BACKGROUND OF THE INVENTION

1. Field Of The Invention

This invention is directed to viewers for sorting machines and to an illumination system for a viewer apparatus for a sorting machine that sorts objects, and, in one aspect, to such a viewer and system for uniformly illuminating an object to be sorted by employing one or more reflectors.

2. Description Of Related Art

The prior art discloses a variety of object sorting apparatuses. In general, these apparatuses have devices for viewing each object and for determining, based on color, whether or not a particular object is desirable or undesirable. Attempts have been made to uniformly illuminate the objects so that the viewer receives an accurate image. But there are a variety of problems associated with prior art illumination systems.

In some prior art apparatuses light is radiated from above onto an object to be viewed, thus producing a shadow on the bottom of the object, a dark area which a viewer may misinterpret as a defect. Shade rings employed to prevent light from going directly from a light source into a viewer do not alleviate the uneven bottom lighting. The use of light sources beneath the object produces a viewer of relatively large dimensions and thus requires that the object move a considerable length before an ejector can act on it. Due to variance in object size and weight, object speed, and ejector speed, it would be difficult to accurately eject only those objects to be ejected with a viewer of such large dimensions. Also, additional light sources require additional maintenance and repair, as well as additional diffusers or shade rings to prevent light from directly entering a viewer. Some prior art devices employ metal covers around lamp filaments to prevent light from directly lighting an object to be sorted, the light reflected onto the object rather than striking it directly.

Typical prior art sorting machines are shown in U.S. Pat. Nos. 3,028,960; 3,914,601; 4,057,146; 4,699,274; 4,513,868; 4,697,709 and 4,454,029 (both commonly owned with the present invention); and U.K. Patent Application 2,136,957A.

There has long been a need for an effective and efficient illumination system for a viewer for a sorting machine. There has long been a need for such a viewer which provides uniform lighting of objects to be sorted, yet which is small enough so that effective object ejection is possible. There has long been a need for such illumination systems and viewers with which substantially all of an object's surface can be lighted.

SUMMARY OF THE PRESENT INVENTION

The present invention, in one embodiment, discloses a viewer for a product sorting machine that has a housing and a light source mounted in the housing near a viewing device for viewing objects to be sorted which pass through a viewing channel of the viewer. In one embodiment, a transparent viewing window is mounted around the channel. The viewing device receives an image of each object and senses its color. When an object of a certain color or colors is sensed, a signal is sent to an ejector which ejects the object once it exits from the viewer. Dark areas are reduced or eliminated by the appropriate placement of reflectors of a suitable size and configuration in the viewer so that light from the light source is reflected onto an object to be viewed. In one embodiment, circular mirrors at the top and/or at the bottom of a viewer provide illumination to substantially all of the surface of an object to be viewed. Discrete reflector plates may be positioned about the housing as desired to provide light to desired portions of an object's surface.

It is preferred that the mirrors, reflector plate or plates be configured and disposed so that little or no reflected light is reflected directly into the viewing device. Shade members may be used, opaque or somewhat translucent, to inhibit or prevent such light from going directly into a viewing device.

It is, therefore, an object of at least preferred embodiments of the present invention:

to provide new, useful, unique, efficient, nonobvious, and effective devices for viewing objects to be sorted;

to provide an illumination system and a viewer with such a system which reduce or eliminate shadow areas on objects to be sorted;

to provide such devices which employ a mirror, mirrors, a reflector plate or plates rather than additional light sources to reduce object shadow areas;

to provide such devices which do not reflect light directly into a viewer; and to provide a viewer which lights substantially all of the surface of an object to be viewed.

The present invention in at least certain preferred embodiments recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DESCRIPTION OF EMBODIMENTS PREFERRED AT THE TIME OF FILING FOR THIS PATENT

Figure 1:
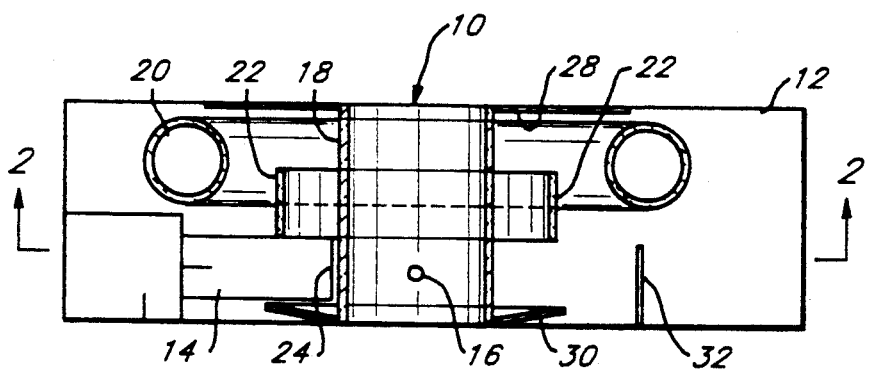
FIG. 1 is a side view in cross-section of a viewer according to the present invention.
Figure 2:
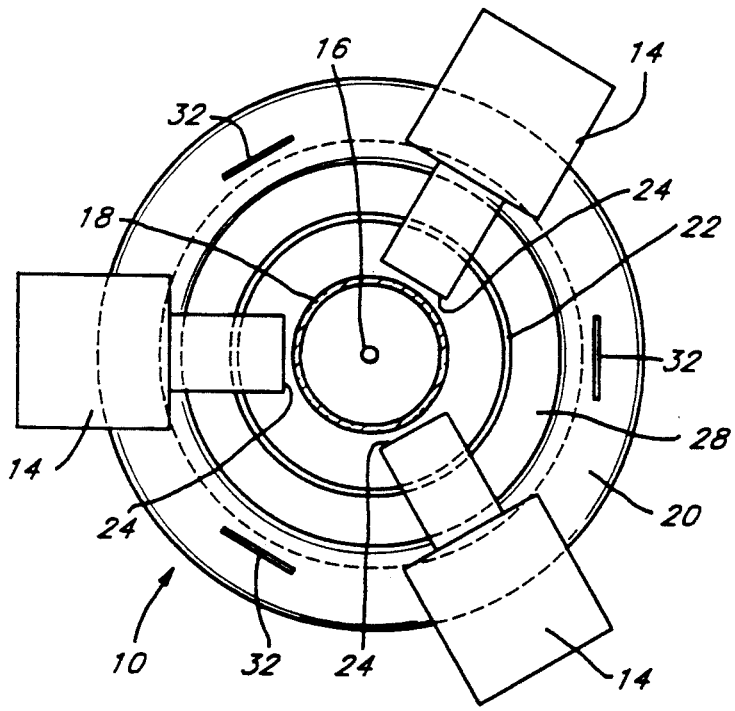
FIG. 2 is a top view of the viewer of FIG. 1 along line 2—2 of FIG. 1 with the housing eliminated.
Figure 3:
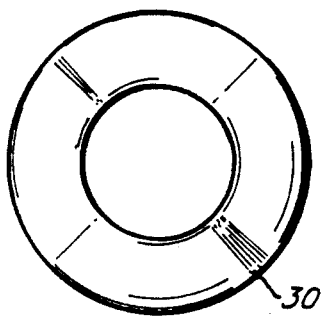
FIG. 3 is a top view of the bottom mirror of the viewer of FIG. 1.

Referring now to FIGS. 1-3, a viewer apparatus 10 according to the present invention has a housing 12 with viewing devices 14 mounted therein. Objects to be sorted such as an object 16 move through a transparent window 18 mounted in the housing 12. A light source 20, e.g. a 20 watt circular fluorescent ring lamp, provides illumination for the objects.

A shade ring 22, preferably opaque, mounted on the devices 14 prevents direct light from the light source 20 from entering an entry end 24 of the viewing devices 14 and it insures that direct light does not illuminate the product being sorted. A background member 32 mounted in the housing 12 provides a background against which the viewing devices 14 view the image of objects to be sorted.

A top mirror 28 is a circular plate that extends around and is secured to the top of the interior of the housing 12. The mirror plate 28 also extends around the top of the transparent window 18. A bottom mirror 30 is also a circular plate that extends around the bottom of the window 18 and is inclined slightly upwardly, preferably at an angle which will cause light reflected from the plate to illuminate areas of the object 16 which would otherwise be dark. As shown in FIG. 1, the mirror 30 is inclined at an angle, preferably about 10 to about 12 degrees. This mirror is also disposed so as to either reduce or prevent the entry of reflected light directly into the viewing devices 14.

Figure 4:
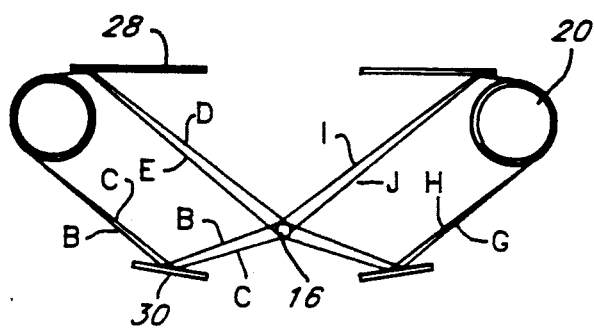
FIG. 4 is a schematic view of illumination of an object in the viewer of FIG. 1.

As shown in FIG. 4, Rays B and C are reflected from the mirror 30 to illuminate areas of the object 16 which otherwise would have some shadow. Rays D and E proceed from the light source 20, are reflected from the top mirror 28, and are then directed onto the object 16. Rays G, H, I, and J corresponding respectively to rays B, C, D, and E provide light to other areas of the object. It is preferred in one embodiment that the top mirror 28 be disposed so that the rays from it (e.g. rays D and E in FIG. 4) be similar in length and it is most preferred that these rays be about the same in length so that light rays of similar or approximately the same strength (i.e. illumination level) illuminate the object. Similarly, it is preferred in this embodiment that the rays B and C be of similar or about the same length and also that rays from the top mirror 28 be similar in length to rays from the bottom mirror 30. This is illustrated, e.g. by the length of the rays E and B in FIG. 4. It is preferred that the ratio of length of a ray from the top mirror to a ray from the bottom mirror be as close to 1:1 as possible. This can be achieved by appropriate location of the mirrors. Similarly, with rays of different length and/or of different strength, a translucent shade ring or rings of appropriate transmissivity can be positioned in the ray's path so that the strength of a ray from one direction is reduced to a level approximately similar to or identical to, the strength of a ray from another direction.

In another embodiment similar ray strength is achieved by adjusting the reflectivity of the mirrors. For example, in an embodiment in which ray E was significantly stronger than ray B, the reflectivity of either mirror 28 or 30, or both, could be adjusted so that the strength of the rays at the point of illumination of the object is similar.

It is within the scope of this invention to use only one of the mirrors, top or bottom, and also to use individual mirror plates rather than a complete circular mirror that extends completely around the housing. It is within the scope of this invention to provide reflected light to only a portion of an object which would otherwise be shadowed or dark or to light substantially all of an object's surface.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to confer the invention broadly in whatever form its principles may be utilized. The present invention is, therefore, well adapted to carry out the objects and obtain the ends and advantages mentioned, as well as others inherent therein.

What is claimed is:

1. A viewer apparatus for an object sorter, the apparatus comprising:
   a housing,
   viewing means mounted in the housing for viewing objects to be sorted,
   a viewing channel through the housing having an opening therethrough through which the objects pass for viewing by the viewing means,
   a light source mounted in the housing for indirectly illuminating a first portion of an object to be viewed by the viewing means,
   reflector means mounted in the housing for reflecting light from the light source to a second portion of the object apart from the first portion to facilitate viewing of the second portion of the object; and
   shade means disposed between the light source and the object so that only indirect light from the light source illuminates the object before the viewing means.

2. The viewer apparatus of claim 1 wherein the reflector means comprises one or more reflector plates disposed so as not to reflect light into the viewing means.

3. The viewer apparatus of claim 1 wherein a viewing window is mounted in the viewing channel.

4. The viewer apparatus of claim 1 wherein the reflector means comprises a mirror disposed above the light source.

5. The viewer apparatus of claim 1 wherein the reflector means comprises a mirror disposed below the light source.

6. The viewer apparatus of claim 1 wherein the reflector means comprises a top mirror disposed above the light source and a bottom mirror disposed below the light source.

7. The viewer apparatus of claim 6 wherein strength of light rays reflected from the top mirror onto the object is similar to strength of light rays reflected from the bottom mirror onto the object.

8. The viewer apparatus of claim 7 wherein reflectivity of one or both mirrors is adjusted to achieve similar ray strength.

9. The viewer apparatus of claim 1 wherein the shade means is disposed to prevent light from the light source from directly entering the viewing means.

10. The viewer apparatus of claim 1 wherein the housing is circular and the light source is a single circular lamp.

11. The viewer apparatus of claim 1 wherein the viewing means includes a plurality of viewing devices spaced apart in the housing.

12. A viewer apparatus for an object sorter, the apparatus comprising
   a housing,
   viewing means mounted in the housing for viewing objects to be sorted,
   a viewing channel through the housing having an opening therethrough through which the objects pass for viewing by the viewing means,
   a light source mounted in the housing for providing light for indirectly illuminating a first portion of an object to be viewed by the viewing means, and
   reflector means mounted in the housing for reflecting light from the light source to a second portion of the object apart from the first portion to facilitate viewing of the second portion of the object,
   the reflector means comprising a top mirror disposed above the light source and a bottom mirror disposed below the light source so that strength of light rays reflected from the top mirror onto the object is similar to strength of light rays reflected from the bottom mirror onto the object,
   shade means disposed between the light source and the object so that only indirect light from the light source illuminates the object, the shade means disposed to prevent light from the light source from directly entering the viewing means.

13. An illumination system for a viewer apparatus for a sorting machine, the machine for sorting objects passed through it and the viewer apparatus having a housing and an object viewing device disposed in the housing for viewing objects passing through a viewing channel in the housing, the illumination system comprising
   a light source mounted in the housing for illuminating a first portion of an object to be viewed by the viewing device,
   reflector means mounted in the housing for reflecting light from the light source to a second portion of the object apart from the first portion to facilitate viewing of the second portion of the object; and
   shade means disposed between the light source and the object so that only indirect light from the light source illuminates the object before the viewing device.

14. The system of claim 13 wherein the reflector means comprises one or more reflector plates disposed so as not to reflect light into the viewing device.

15. The system of claim 13 wherein the reflector means comprises a mirror disposed above the light source.

16. The system of claim 13 wherein the reflector means comprises a mirror disposed below the light source.

17. The system of claim 13 wherein the reflector means comprises a top mirror disposed above the light source and a bottom mirror disposed below the light source.

18. The system of claim 17 wherein strength of light rays reflected from the top mirror onto the object is similar to strength of light rays reflected from the bottom mirror onto the object.

19. The system of claim 18 wherein the reflectivity of one or both mirrors is adjusted to achieve similar ray strength.

20. The system of claim 13 wherein the shade means is disposed to prevent light from the light source from directly entering the object viewing device.

21. An illumination system for a viewer apparatus for a sorting machine, the machine for sorting objects passed through it and the viewer apparatus having a housing and an at least one object viewing device disposed in the housing for viewing objects passing through a viewing channel in the housing, the illumination system comprising
   a light source mounted in the housing for providing light for indirectly illuminating a first portion of an object to be viewed by the viewing device, and
   reflector means mounted in the housing for reflecting light from the light source to a second portion of the object apart from the first portion to facilitate viewing of the second portion of the object,
   the reflector means comprising a top mirror disposed above the light source and a bottom mirror disposed below the light source to that strength of light rays reflected from the top mirror onto the object is similar to strength of light rays reflected from the bottom mirror onto the object, and
   shade means disposed between the light source and the object so that only indirect light from the light source illuminates the object, the shade means disposed to prevent light from the light source from directly entering the at least one object viewing device.

* * * * *